May 8, 1962 J. H. ENGELBRECHT ET AL 3,033,171
INTERLOCKING MEANS FOR HYDRAULIC SERVOMOTOR SYSTEMS
Filed Sept. 7, 1960

INVENTORS
JOHN H. ENGELBRECHT
FRANK SEIDEN
BY
ATTORNEY

United States Patent Office 3,033,171
Patented May 8, 1962

3,033,171
INTERLOCKING MEANS FOR HYDRAULIC
SERVOMOTOR SYSTEMS
John H. Engelbrecht, Jamaica, and Frank Seiden, Carle
Place, N.Y., assignors to Sperry Rand Corporation,
Great Neck, N.Y., a corporation of Delaware
Filed Sept. 7, 1960, Ser. No. 54,504
9 Claims. (Cl. 121—40)

This invention relates to an hydraulic system having a servomotor with improved interlocking means between the relatively movable elements of the servomotor. The system includes a fluid pressure line, a fluid return line, and a control valve for operating the servomotor that is connected differentially between the fluid pressure line and the fluid return line. The disengagement of the component parts of the interlocking means is dependent upon the pressure in the fluid pressure line of the system. When the pressure available from the pressure line fails or falls below a predetermined safe operating value, the relatively movable interlocking components of the means engage to prevent relative movement between the normally movable elements of the servomotor. The invention is particularly adapted for use in power systems of the character described where the servomotor is operatively connected to a suitable mechanical load such as an aircraft landing gear control linkage to move the linkage between predetermined raised or lowered travel limits and hold the linkage in one of its positions as long as sufficient pressure is available to the servomotor from the line for safe operation.

A feature of the present invention is to provide a system of the character described in which the locking structure may be disengaged to permit movement of the elements of the servomotor under conditions where there is insufficient pressure or pressure failure in the system. The load or linkage connected to the servomotor is therefore movable from one of its limiting positions to the other position in the system where necessary without the need of fluid pressure.

One of the features of the invention resides in the inclusion in the servomotor of the system of cooperative locking means and a piston type valve controlled by the pressure in the fluid pressure line having pressure line and return line seats that selectively connect the locking means to the fluid pressure line on the fluid return line.

Another feature of the invention resides in the provided disengageable locking structure for the servomotor consisting of a movable tapered pin in the housing and a groove in the piston rod element of the servomotor having a taper corresponding to the taper of the pin.

Figure 1:
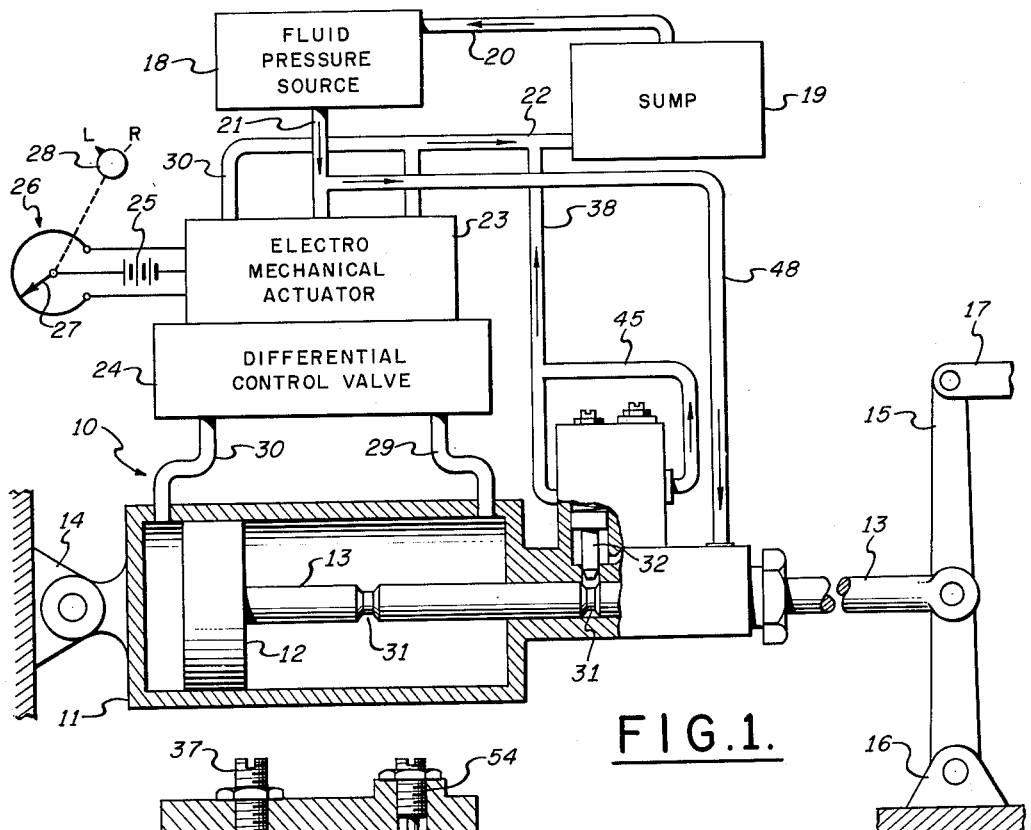
Figure 2:
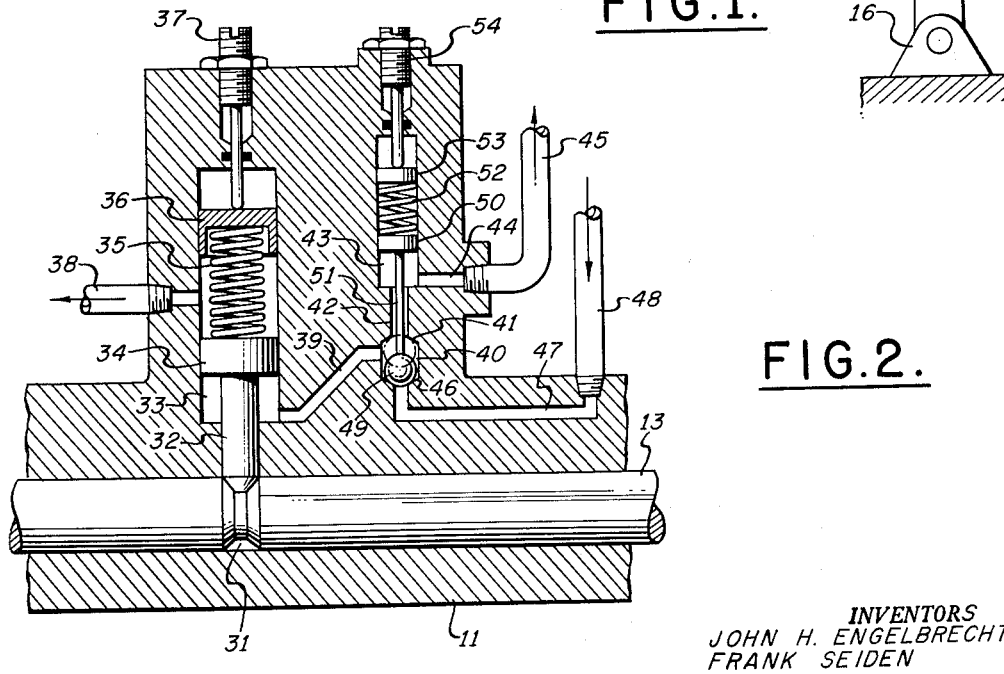

Other features and structural details of the invention will be apparent from the following description when read in relation to the accompanying drawings, wherein, FIG. 1 is a schematic representation of an improved hydraulic system constructed in accordance with the present invention in which the housing of the servomotor is shown in partial cross section, and FIG. 2 is an enlarged cross section view of the portion of the servomotor housing containing the interlocking structure of the system including the engageable pin and groove and the selective piston type valve.

As particularly shown in FIG. 1, the improved hydraulic system includes a servomotor 10 having a housing 11 with a cylindrical bore part and a relatively movable part consisting of a reciprocating piston 12 that fits the bore of the housing and a piston rod 13 that extends from one end of the housing. The other end of the housing 11 is pivotally connected to a fixed bracket 14. In the cylinder-piston type of servomotor shown, the extending end of rod 13 is connected to a suitable load through a pivotal connection to a rocker 15, one end of which is pivoted to a fixed bracket 16 and the other end of which is connected to the load through a link 17. The stroke of the servomotor determines the angular motion of the rocker 15 and travel limits of the system.

The elements provided in the system for operating the servomotor 10 include a suitable fluid pressure source or pump 18 and a fluid sump 19 connected to the pump by way of fluid line 20. The pressure fluid line 21 and the return fluid line 22 of the system are differentially connected to the servomotor 10 through a suitable electromechanical actuator 23 and differential control valve 24 of the character shown in U.S. Letters Patent No. 2,864,239, issued December 16, 1958 to G. H. Taylor. As shown, the actuator 23 is conditioned by a suitable bridge circuit including battery 25 and potentiometer 26 with slider 27 set by control knob 28 to locate the piston 12 of the servomotor 10 to its left travel limit with relation to the housing 11. In the L position of knob 28 fluid under pressure from line 21 is supplied to the servomotor-housing 11 by way of line 29 from the control valve 24. The line 30 between the valve 24 and housing 11 is then connected through the valve 24 to the return line 22 of the system. Changing the setting of the knob 28 to the R position controls the actuator 23 to reverse the valve 24 and supply fluid under pressure from line 21 to line 30 as well as connect line 29 to the return line 22 to the sump. The piston 12 accordingly moves to its right hand limiting position with relation to the housing 11 and moves the linkage to the load consisting of rocker 15 and link 17 correspondingly.

The provided means for interlocking the respective parts of the servomotor include cooperative engaging means shown as a detent, groove or notch 31 located in the piston rod part 13 of the servomotor and a relatively movable part shown as a slide catch or pin 32 located in the housing part 11 of the servomotor. In engaged condition as shown in FIG. 2, the end of pin 32 slides into the notch 31 to prevent relative movement between the parts of the servomotor. A second notch 31 may be included on the rod 13 to lock the servomotor when the piston 12 is at its right hand travel limit. As shown, the sides of the notch or detent 31 are tapered and the end of the cooperating pin or catch is tapered to fit the notch or detent 31 so that the rod 13 may be moved with relation to the housing 11 under conditions where there is a pressure failure in the system from one of its travel limits to the other if necessary. The means carried by the housing 11 provided to engage and disengage the catch 32 and detent 31 include a cylinder 33-piston 34 structure in which the pin or catch 32 is located at the end of the rod of the piston 34. Piston 34 in housing 11 moves at right angles to the rod 13 and is normally responsive to the fluid pressure of the line 21 to disengage the catch and detent as shown in FIG. 1, where the engageable elements are disengaged. A spring 35 located in one end of the cylinder 33 provides a biasing means for the piston moving means 34 that exerts a force thereon in a direction that engages the catch and detent. The degree of bias exerted by the spring 35 may be controlled by axial adjustment of a slide member 36 within the cylinder 33 through a contacting settable screw fastening 37 in the housing 11. The portion of the cylinder 33 containing the biasing spring 35 is connected to the sump 19 of the system by way of fluid line 38 that connects with return fluid line 22. The means for moving the catch or pin 32 is constituted by the piston rod of the provided piston 34-cylinder 33 structure where the piston 34 is connected to the rod. The piston and pressure chamber of the cylinder 33-piston 34 structure further constitutes means dependent on the pressure in the fluid pressure line 21 for operating the moving means in opposed relation to the spring 35 to disengage the catch and detent.

The housing part 11 of the servomotor shown in FIG. 2 further provides fail safe responsive means for selectively connecting the catch and detent disengaging means to the fluid return line 22 and to the fluid pressure line 21. To obtain this result, the structure shown includes a conduit 39 that connects one end of the cylinder 33 to a valve chamber 40. The valve chamber 40 is selectively connected to either the pressure line 21 or return line 22. The connection between the line 22 and chamber 40 includes a return line valve seat 41, passageway 42 in the housing 11, a cylindrical chamber 43 in the housing 11, passageway 44 and fluid line 45 that connects with the return fluid line 38, FIG. 1. The connection from the valve chamber 40 to the fluid pressure line 21 is provided by a pressure line valve seat 46 and a passageway 47 in the housing part 11 that connects with fluid line 48, FIG. 1. The valve chamber 40 is a cylinder in which the piston type valve element 49 per se is either positioned on seat 46 as shown in full lines in FIG. 2 to close the fluid pressure line or is positioned on seat 41 to close the return line as indicated by the dotted line position of the valve element in the same figure.

The selective connecting means provided includes means for biasing the valve 49 in the full line position shown in FIG. 2 in which the cylinder 33 is connected by way of chamber 40 to the return line and the pin 32 under the bias of spring 35 is engaged in notch 31 and the relatively movable parts of the servomotor 11 are interlocked as indicated in this view. The biasing means provided to obtain this result includes a further cylinder, piston arrangement in which the piston 50 moves in the cylinder 43 and is connected to the valve 49 by a stem 51 that extends through the passageway 42. The bias is provided by a spring 52 that engages the piston 50. The degree of bias exerted by the spring 52 may be controlled by axial adjustment of a slide member 53 within the cylinder 43 through a contacting settable screw fastening 54 in housing 11.

The piston type valve 49 moves between the relatively opposed seats 41 and 46 of the valve chamber 40 and is responsive to the pressure in the fluid pressure line against the force of the valve biasing means 52. When the pressure in the fluid pressure line 21 is at a safe operating value, the piston valve 49 is moved to the dotted line position shown in FIG. 2 responsive to the pressure in the pressure line. With the valve 49 against seat 41, the passageway 42 to the return line 22 is closed. The cylinder 33 or catch and detent disengaging means is then connected to the pressure line 21 by way of chamber 40 and conduit 39 and the influence of the biasing spring 35 is overcome so that the pin 32 is disengaged from the notch 31 as shown in FIG. 1. The pressure at which engagement and disengagement of the pin and notch 31 takes place is established by the adjustment of the fastenings 37 and 54 of the system. With failure of the pressure source 18 or loss of fluid pressure in the system below the value set by the provided biasing means, the valve 49 engages its pressure line seat 46 in chamber 40 to close the passageway 47 and spring 35 is then effective to engage the pin 32 and notch 31 as shown in FIG. 2. The tapered end of the pin 32 and correspondingly tapered sides of the notch 31 interfit to provide a cam type lift for the piston 34 that can overcome the force of the spring 35 to release the lock so that the parts of the servomotor can be moved to its other limiting position if necessary without damage to the servomotor. Notches 31 may be provided for each of the limiting positions of the piston 12 as shown in FIG. 1.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an hydraulic system having a fluid pressure line, a fluid return line, a servomotor having a housing with a bore part and a part fitting the bore movable with relation to the housing between determined limits, and a control valve for operating the servomotor connected differentially between the fluid pressure line and the fluid return line; means for interlocking the parts of the servomotor at one of the travel limits including a detent fixed to one of the parts and a catch movable with relation to the other part to engage and disengage the detent, means carried by the other part of the servomotor connected to move the catch, biasing means between said other part and moving means for exerting a force on the moving means in a direction to engage the catch and detent, means dependent on the pressure in the fluid pressure line for operating said moving means in opposed relation to the biasing means to disengage the catch and detent, fail safe pressure responsive means for selectively connecting said catch and detent disengaging means to the fluid pressure line and the fluid return line including a chamber in the other part with a return line valve seat, a pressure line valve seat, conduit means connecting the chamber and disengaging means, a piston type valve movable between the seats to close the fluid return line responsive to the pressure in the fluid pressure line and connect the disengaging means to the fluid pressure line, and means for biasing the piston type valve to close the fluid pressure line when the fluid pressure in the pressure line drops below a predetermined value and connect the disengaging means to the fluid return line.

2. A system as claimed in claim 1, in which the one part of the servomotor is the part fitting the bore and movable with relation to the housing, and the other part of the servomotor is the housing.

3. A system as claimed in claim 1, in which the one part of the servomotor is a piston and piston rod, and the detent is a tapered groove located in the rod, the other part of the servomotor is the housing, and the catch is a pin with a taper fitting the taper of the groove movable in relation to the piston rod to engage and disengage the groove in the rod.

4. In an hydraulic system having a fluid pressure line, a fluid return line, a servomotor having a housing with a cylindrical bore and a reciprocating piston and piston rod movable with relation to the housing in the bore between determined travel limits, and a control valve for operating the servomotor connected differentially between the fluid pressure line and the fluid return line; means for interlocking the elements of the servomotor at one of the travel limits including a notch in the piston rod and a slide pin mounted in the housing to engage and disengage the notch, means carried by the housing for actuating said pin including a piston movable in a bore in the housing connected to the pin, a spring between the housing and piston for biasing the actuating means to engage the pin and notch, means dependent on the pressure in the fluid pressure line for operating said pin actuating means in opposed relation to the biasing spring to disengage the pin and notch, fail safe pressure responsive means for selectively connecting said pin and notch disengaging means to the fluid pressure line and the fluid return line including a chamber in one of the parts of the servomotor with a return line valve seat, a pressure line valve seat, conduit means connecting the chamber and disengaging means, a piston type valve movable between the seats to close the fluid return line responsive to the pressure in the fluid pressure line and connect the disengaging means to the fluid pressure line, and a spring between the housing and piston type valve for biasing the piston type valve to close the fluid pressure line when the fluid pressure in the pressure line drops below a predetermined value and connect the disengaging means to the fluid return line.

5. A system as claimed in claim 4, in which the chamber of the piston type valve is located in the housing of the servomotor.

6. In an hydraulic system of the class described, a fluid pressure line, a differential servomotor connected to the fluid pressure line having a housing with a cylindrical bore part and a part fitting the bore movable with relation to the housing between determined travel limits; means for interlocking the parts of the servomotor including a detent fixed to one of the parts and a catch movable with relation to the other part to engage and disengage the detent, a piston movable in a bore in said other part connected to move said catch, means between the other part and piston for biasing the catch to engage the detent, fail safe pressure responsive means for disengaging the catch and detent against the force of said biasing means including a chamber in the other of the parts of the servomotor with a pressure line valve seat, conduit means connecting the chamber and disengaging means, a piston type valve responsive to the pressure in the fluid pressure line to operate the disengaging means, and means for biasing the piston type valve to engage the pressure line valve seat and close the fluid pressure line when the fluid pressure in the pressure line drops below a predetermined value.

7. A system as claimed in claim 6, in which the one part of the servomotor is a piston and piston rod, and the detent is a tapered notch located in the rod, the other part of the servomotor is the housing, and the catch is a slide pin with a taper fitting the taper of the notch movable in relation to the piston rod to engage and disengage the notch in the rod.

8. A system as claimed in claim 6, in which the piston type valve chamber is located in the housing part of the servomotor.

9. In an hydraulic system of the class described, a fluid pressure line, a differential servomotor connected to the fluid pressure line having a housing with a cylindrical bore and a reciprocating piston and piston rod movable with relation to the housing in the bore between determined travel limits; means for interlocking the elements of the servomotor including a notch in the piston and a slide pin mounted in the housing to engage and disengage the groove, a piston movable in a bore in the housing connected to move the pin, a spring between the housing and pin moving piston for biasing the pin to engage the notch, fail safe pressure responsive means for disengaging the pin and notch against the force of the biasing spring including a chamber in the housing of the servomotor with a pressure line valve seat, conduit means connecting the chamber and disengaging means, a piston type valve responsive to the pressure in the fluid pressure line to operate the disengaging means, and means for biasing the piston type valve to engage the pressure line valve seat and close the fluid pressure line when the fluid pressure in the pressure line drops below a predetermined value.

References Cited in the file of this patent

UNITED STATES PATENTS

| | | |
|---|---|---|
| 2,342,812 | Martinson | Feb. 29, 1944 |
| 2,698,157 | Ludeman | Dec. 28, 1954 |
| 2,861,549 | Gardener | Nov. 25, 1958 |
| 2,908,251 | Gratzmuller | Oct. 13, 1959 |